J. HUEBNER.
TIRE FOR VEHICLES AND METHOD OF MAKING THE SAME.
APPLICATION FILED AUG. 10, 1916.

1,227,791. Patented May 29, 1917.

UNITED STATES PATENT OFFICE.

JOSEF HUEBNER, OF MILWAUKEE, WISCONSIN, ASSIGNOR TO PAN-AMERICAN RUBBER CO., OF MILWAUKEE, WISCONSIN, A CORPORATION OF WISCONSIN.

TIRE FOR VEHICLES AND METHOD OF MAKING THE SAME.

1,227,791.      Specification of Letters Patent.      Patented May 29, 1917.

Application filed August 10, 1916. Serial No. 114,247.

*To all whom it may concern:*

Be it known that I, JOSEF HUEBNER, a subject of the Emperor of Germany, residing at Milwaukee, in the county of Milwaukee and State of Wisconsin, have invented certain new and useful Improvements in Tires for Vehicles and Methods of Making the Same, of which the following is a specification.

This invention relates to vehicle tires and has for its primary object the provision of a highly resilient and durable tire adapted to replace pneumatic tires and to eliminate the inherent defects of such tires, yet preserve and enhance the desirable qualities thereof.

A further object of my invention is the provision of a tire consisting of a core constructed of a solid material having a multiplicity of closed cells filled with a gaseous medium and a casing vulcanized to said core.

A further object of my invention is the provision of a method of making vehicle tires in which a core of vulcanizable material having a multiplicity of closed cells is covered and protected by a casing vulcanized thereto.

Further objects and advantages of my invention will be apparent as it is better understood by reference to the following specification when read in connection with the accompanying drawing, illustrating the preferred embodiments thereof, in which—

Figure 1:
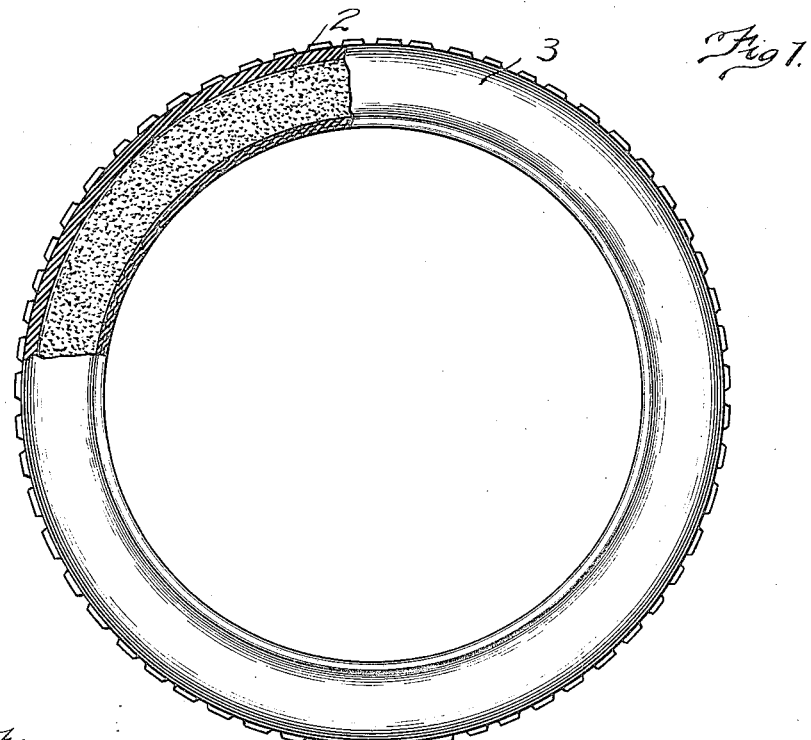
Figure 1 is a side elevation partially broken away of a tire according to my invention.
Figure 2:
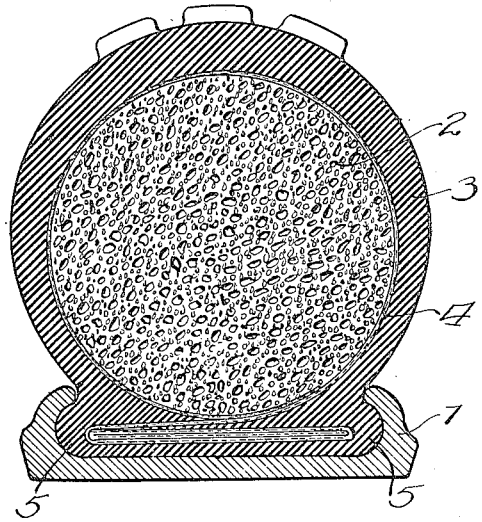
Fig. 2 is an enlarged transverse section through a tire as illustrated in Fig. 1 with the supporting rim.

The core of my improved tire is made of a vulcanizable rubber compound to which certain volatile and preservative ingredients have been added. The volatile ingredients cause the rubber when heated under suitable conditions to expand and assume a cellular structure which is retained when the compound is vulcanized. The preservative ingredient maintains the moist condition of the rubber after vulcanization and insures the resiliency of the tire until the casing is worn away and the tire is discarded.

Preferably the material is prepared as follows, it being understood that the description is illustrative and that changes may be made in the various ingredients and the relative proportions thereof without departing from the spirit and scope of the invention. In producing the compound I employ by weight substantially the following proportions of ingredients, viz., sixty (60) parts rubber gum, five (5) parts resin oil, ten (10) parts of zinc oxid, ten (10) parts spirits of turpentine, five (5) parts flowers of sulfur and ten (10) parts ammonium carbonate.

These ingredients are preferably mixed in the order named by passing the gum rubber repeatedly through the usual rolls to thoroughly incorporate each ingredient therewith and distribute it evenly through the mass of rubber in a finely divided state. The resulting compound is rolled into a flat sheet, substantially one-quarter inch in thickness and is ready for the succeeding operation.

The operator, after trimming the sheet to provide a straight edge tightly rolls the sheet, or so much thereof as is necessary, into an elongated cylinder of a diameter slightly less than the desired cross-sectional diameter of the tire core. The cylinder is then cut to the exact length of the circumference of the finished tire.

Another rubber compound is prepared containing only gum rubber and sulfur or other usual vulcanizing ingredients commonly employed in tire casings. This compound, after being thoroughly worked is rolled into a sheet and wrapped about the previously prepared core. During the latter operation frictioned fabric may be incorporated with the rubber compound forming the casing. Whether or not fabric is employed will depend upon the size and character of the tire.

The ends of the cylinder are then joined to form an annulus with the portions of the casing intended to be employed as the tread on the outer periphery thereof and the annulus is placed in a suitable mold so constructed as to be gas-tight and sufficiently strong to withstand the pressure generated in the subsequent treatment.

The mold is placed in a vulcanizing drum and subjected to heat by means of steam surrounding the mold. Primarily steam under substantially five (5) pounds pressure is admitted to the drum for a period of five (5) minutes more or less. The pressure is then increased to ten (10) pounds and is maintained for ten (10) minutes more or less. The pressure is gradually increased, preferably five pounds at a time and is maintained the same number of minutes as the pounds pressure indicated until thirty-five (35) pounds pressure more or less has been attained in the drum, the pressure being continuously maintained for one (1) hour and fifty (50) minutes more or less, depending upon the size of the tire. The mold is removed when vulcanization is complete and is permitted to cool.

During the initial steps of heating which precede the vulcanization the turpentine and ammonium carbonate constituting volatile ingredients of the rubber compound forming the core are transformed into gas globules, which expand and produce cells, the prolonged continuation of the heat at a point below that required for vulcanization giving the finely divided volatile matter time to become fully expanded before the rubber compound sets. At each increase of temperature, the heat being applied through the mold housing, the outer cells expand first and it is essential, therefore, that each increased temperature be maintained sufficiently long for the heat to penetrate the rubber which would otherwise be unevenly expanded. The rubber compound forming the casing contains no volatilizable ingredients and does not assume the cellular structure of the core but provides a tough wear-resisting cover therefor.

By subjecting the tire to the above described treatment I produce a rubber core having a multiplicity of evenly distributed closed cells, which gives to the core a high degree of resiliency, and a puncture-proof tire possessing many advantages over pneumatic or other forms of tires.

The resin oil is a non-hardening and non-drying substance and when thoroughly mixed with the compound prevents it from becoming hard and brittle as is usual with compounds of this character. The full resiliency of the tire throughout its life is thereby assured.

Referring to the drawing, 1 indicates a rim upon which the tire is supported. The tire consists of a core 2 of rubber having a multiplicity of closed cells and a casing 3 vulcanized to said core. The casing 3 may be provided with fabric 4 to strengthen the tire and with suitable beads 5 to engage the rim 1.

Figure 3:
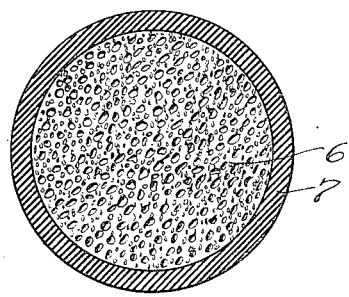
Fig. 3 is a transverse section through a somewhat different form of my invention.

In Fig. 3 of the drawing I have illustrated a slightly different form of my invention best adapted for small tires such as those employed on bicycles. The tire comprises a core 6 of cellular rubber and a casing 7 of rubber vulcanized to said core. The form of my invention illustrated in Fig. 3 was illustrated and claimed in my application Serial No. 108,817, filed July 12, 1916, and this subject-matter is divided from my aforesaid application, and forms part of the disclosure in this case.

Tires constructed in accordance with my invention are more resilient than properly inflated pneumatic tires and consequently the wear and strain on the casing is materially diminished, thereby increasing the life of the tire. My tires are free, moreover, from the annoying possibility of puncture or blow-out and are adapted to replace pneumatic tires without dispensing with any of the advantages thereof.

Various changes may be made in the form and proportion of the parts without departing from the spirit and scope of my invention or sacrificing any of its material advantages, the forms hereinbefore described being merely the preferred embodiments of my invention.

I claim:

1. A tire for vehicles comprising an inner tire or core of a solid material having a multiplicity of closed cells and a wear resisting tire casing of rubber vulcanized thereto.

2. A tire for vehicles comprising an inner tire or core of vulcanized rubber compound having a multiplicity of closed cells and a wear resisting tire casing of rubber vulcanized thereto.

3. A tire for vehicles comprising an inner tire or core of vulcanized rubber, embodying a preservative agent and having a multiplicity of closed cells containing a gaseous medium, and a wear resisting tire casing of rubber vulcanized to said core.

4. A method of making vehicle tires which comprises incorporating a volatile ingredient with a vulcanizable rubber compound, forming an elongated cylindrical core therefrom, surrounding said core with a casing of vulcanizable rubber compound connecting the ends of said core to form an annulus, subjecting said annulus in a suitable mold to successively increased temperatures, and maintaining said mold at a vulcanizing temperature for a period sufficient to vulcanize said core and casing.

5. A method of making vehicle tires which comprises incorporating volatile and preservative ingredients with a vulcanizable rubber compound, forming an elongated cylindrical core therefrom, surrounding said core with a casing of vulcanizable rubber compound, connecting the ends of said core to form an annulus, subjecting said annulus in a suitable mold to successively increased temperatures, and maintaining said mold at a vulcanizing temperature for a period sufficient to vulcanize said core and casing.

6. A method of making vehicle tires which comprises incorporating ingredients adapted to be volatilized at temperature lower than that necessary for vulcanization with a vulcanizable rubber compound, forming a sheet of said compound, rolling said sheet to form an elongated cylindrical core, surrounding said core with a casing of vulcanizable rubber compound, connecting the ends of said core to form an annulus, subjecting said annulus in a suitable mold to successively increased temperatures, and maintaining said mold at a vulcanizing temperature for a period sufficient to vulcanize said core and casing.

7. A method of making vehicle tires which comprises incorporating a preservative ingredient and an ingredient, adapted to be volatilized at temperatures lower than that necessary for vulcanization, with a vulcanizable rubber compound forming a sheet of said compound, rolling said sheet to form an elongated cylindrical core, surrounding said core with a casing of vulcanizable rubber compound, connecting the ends of said core to form an annulus, subjecting said annulus in a suitable mold to successively increased temperatures, and maintaining said mold at a vulcanizing temperature for a period sufficient to vulcanize said core and casing.

JOSEF HUEBNER.

Witnesses:
JOSEF HUEBNER, Jr.,
WM. O. BELT.